UNITED STATES PATENT OFFICE.

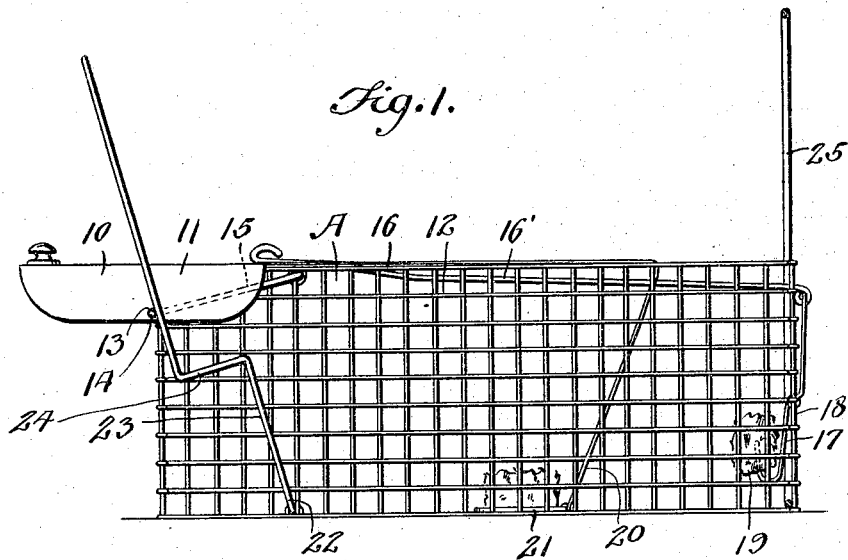
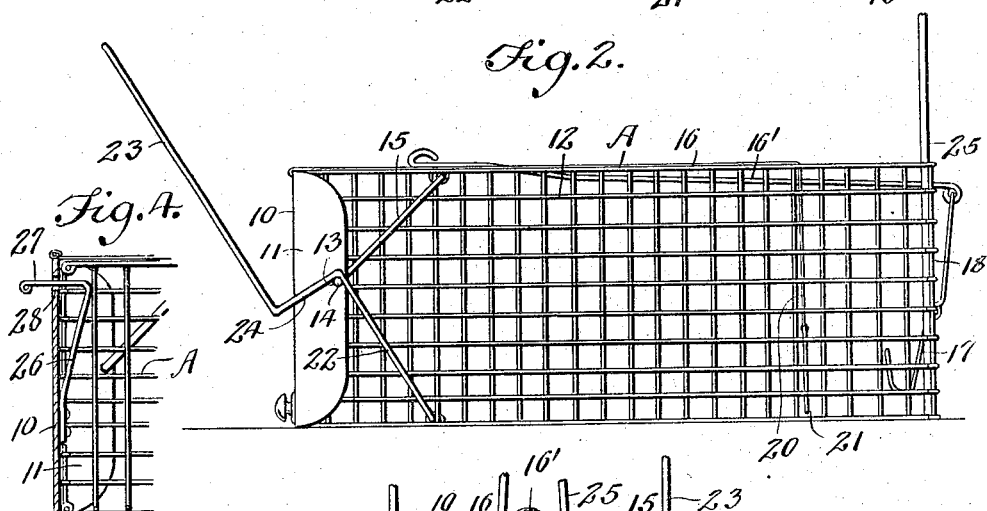
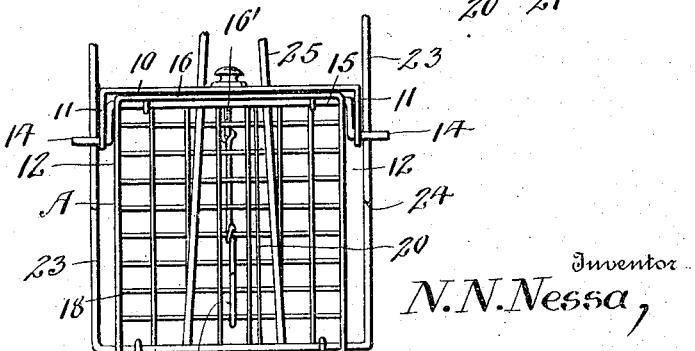

NICHOLAS N. NESSA, OF BADGER, IOWA.

ANIMAL-TRAP.

1,191,027.  Specification of Letters Patent.  Patented July 11, 1916.

Application filed May 5, 1916. Serial No. 95,635.

*To all whom it may concern:*

Be it known that I, NICHOLAS N. NESSA, a citizen of the United States, residing at Badger, in the county of Webster and State of Iowa, have invented new and useful Improvements in Animal-Traps, of which the following is a specification.

This invention contemplates the provision of a rat trap or the like, wherein the animals are trapped in a receptacle for the purpose of being subsequently killed by drowning.

More specifically stated the invention embodies a receptacle which the animals are adapted to enter from one end, a trip door being provided to gravitate to closed position when the animals attempt to secure the bait within the receptacle, thereby trapping the animals within the latter.

An important object of the invention resides in the provision of an automatically operable element for locking the door in its closed position, and in which position of parts said element is susceptible for use in the capacity of a handle for carrying the trap.

The nature and advantages of the invention will be better understood when the following description is taken in connection with the accompanying drawing, the invention residing in the construction, combination and arrangement of parts as claimed.

In the drawing forming part of this specification like numerals of reference indicate similar parts in the several views and wherein:—

Figure 1 is a side elevation of the trap showing the normal position of parts. Fig. 2 is a similar view showing the active position of the parts. Fig. 3 is an end elevation. Fig. 4 is a sectional view showing a modified form of latch.

A trap constructed in accordance with my invention essentially consists of a receptacle indicated generally at A, and which may be of any suitable design. As shown the receptacle is elongated and of rectangular formation, and preferably constructed from foraminated material of any suitable mesh. The receptacle is open at one end to provide an entrance passage, access to the receptacle being controlled by means of a door 10.

The door is preferably constructed from sheet metal, of an area to cover the open end of the receptacle and formed to provide parallel flanges 11 disposed exteriorly of the side walls 12 of the receptacle. The flanges 11 are provided with openings 13 for the reception of the offset terminals 14 of a yoke member 15, upon the offset terminals 14 of which the door is pivotally mounted. The yoke 15 is swingingly mounted upon the top wall 16 of the receptacle, which fact combined with the fact that the door is pivotally mounted on the offset terminals of the yoke, permits the door subsequent to being elevated by the swinging movement to the yoke 15 to assume a horizontal position thereby resting upon the top of the receptacle in the manner illustrated in Fig. 1. With a view of holding the door in this position, I employ a longitudinally disposed trip rod 16, which is mounted in any suitable manner to reciprocate, one end of the rod adapted to overlie the adjacent end of the door 10, while the opposite end of the rod is connected with the adjacent terminal of a bait hook 17, the latter being pivotally mounted upon the end wall 18 of the receptacle and having its hook portion disposed within the receptacle. Manifestly when an animal enters the receptacle through the open end thereof, and attempts to secure the bait 19, the hook 17 will be rocked upon its fulcrum in the direction to cause the trip rod 16 to be moved rearwardly out of engagement with the cover 10, which latter instantaneously under such conditions gravitates to its closed position. As a substitute for this setting and tripping mechanism, use is also made of a flexible element 20 which has one end secured to the adjacent edge of the door 10, while supported on the opposite end of the element is a hook 21, the latter being adapted to be suspended within the receptacle through an opening in the top wall thereof. Bait of any suitable character is adapted to be supported upon the hook, and under the weight of the bait the element 20 is held taut and the door 10 in normal opened position. When the animal enters the trap and removes the bait from the hook 21, upon which the bait is loosely supported, the door 10 immediately gravitates to closed position thereby trapping the animal within the receptacle.

Swingingly mounted upon the bottom of the receptacle is a yoke 22, the parallel limbs 23 of which are disposed exteriorly of the side walls 12 of the receptacle, each having an offset portion defining shoulders 24. When the door is in its normal opened position as shown in Fig. 1, the yoke 22 is moved to a position wherein the parallel limbs 23 rest against the offset terminals 14 of the yoke 15, at a point above the shoulders 24. Immediately upon a release of the door, at which time the latter gravitates to its closed position, the yoke 22 simultaneously and automatically gravitates to the position illustrated in Fig. 2 wherein the shoulders 24 are disposed in advance of the offset terminals 14 of the yoke 15 thereby locking the door in its closed position. A handle 25 is secured to the rear wall of the receptacle and projects an appreciable distance above the top thereof for the purpose of permitting the trap to be conveniently carried from place to place. The animals are merely trapped in the receptacle A, it being the intention to kill the animals by drowning when the trap is submerged into a tub of water or the like. The animals may then be subsequently discharged from the trap by grasping the handle 25 and holding the receptacle in an inclined position, it of course being understood that the yoke member 22 must be moved to inoperative position to permit the door 10 to be elevated to opened position.

In Fig. 4 I have illustrated a modified form of latch mechanism which consists of a substantially L-shaped resilient strip of metal, the limb 26 being secured to the inner face of the door 10 while the limb 27 projects through a slot 28 therein whereby the latch element can be grasped by the fingers to move the same to an inoperative position, it being obvious that the limb 27 when the door is closed is disposed immediately beneath the top wall of the receptacle and prevents the door from being opened, until the limb 27 is moved entirely from beneath the top wall of the receptacle. With the parts in normal position, at which time the door is opened in the manner illustrated in Fig. 1, the latch element rests upon the top of the receptacle, and automatically assumes its operative position when the door gravitates to closed position as shown in Fig. 4.

While it is believed that from the foregoing description the nature of the invention will be readily apparent I desire to have it understood that I do not limit myself to this exact construction and arrangement, and that such changes may be resorted to when desired as fall within the scope of what is claimed.

What is claimed is:—

1. A trap comprising a receptacle open at one end, a yoke member swingingly mounted on the receptacle and having offset terminals, a door pivotally mounted upon said terminals, means for normally holding the door in opened position and adapted to be tripped to permit the door to gravitate to closed position, and an automatic operable locking element adapted to coöperate with said yoke to hold said door closed.

2. A trap comprising a receptacle open at one end, a yoke member swingingly mounted on the receptacle and having offset terminals, a door pivotally mounted upon said terminals and normally resting upon the top of the receptacle in opened position, a longitudinally movable arm mounted on the receptacle and having one end normally overlying the adjacent edge of the door to maintain the latter in opened position, and animal controlled means for adjusting said arm to release the door whereby the latter gravitates to closed position.

3. A trap comprising a receptacle open at one end, a yoke member swingingly mounted on the receptacle and having offset terminals, a door pivotally mounted upon said terminals and normally resting upon the top of the receptacle in opened position, a longitudinally movable arm mounted on the receptacle and having one end normally overlying the adjacent edge of the door to maintain the latter in opened position, animal controlled means for adjusting said arm to release the door whereby the latter gravitates to closed position, and an automatic operable locking element adapted to coöperate with said yoke to hold the door closed.

4. A trap comprising a receptacle open at one end, a yoke member swingingly mounted on the receptacle and having offset terminals, a gravitating door pivotally mounted upon the terminals and normally resting upon the top of the receptacle in opened position, means for holding the door in opened position, animal controlled means for releasing the door, and a second yoke swingingly mounted on the receptacle and coöperating with the first mentioned yoke to hold the door in closed position.

5. A trap comprising a receptacle open at one end, a yoke member swingingly mounted on the receptacle and having offset terminals, a door pivotally mounted upon said terminals, means for normally holding the door in opened position and adapted to be tripped to permit the door to gravitate to closed position, a second yoke swingingly mounted on the receptacle and formed with shoulders adapted to automatically assume a position in advance of said offset terminals to hold the door closed.

In testimony whereof I affix my signature.

NICHOLAS N. NESSA.

Witnesses:
T. K. PETERSON,
THEO. J. TOPHEINS.

Copies of this patent may be obtained for five cents each, by addressing the "Commissioner of Patents, Washington, D. C."